United States Patent [19]

Ciccarone

[11] Patent Number: 4,706,197
[45] Date of Patent: Nov. 10, 1987

[54] DEVICE FOR CORRECTING FUNCTIONAL QUANTITIES IN AN INTERNAL COMBUSTION ENGINE

[75] Inventor: Angelo Ciccarone, Milan, Italy

[73] Assignee: Alfa Romeo Auto S.p.A., Napoli, Italy

[21] Appl. No.: 689,281

[22] Filed: Jan. 7, 1985

[30] Foreign Application Priority Data

Jan. 20, 1984 [IT] Italy .............................. 19263 A/84

[51] Int. Cl.⁴ ........................ F02P 5/14; G06F 15/20
[52] U.S. Cl. ............................... 364/431.08; 123/425; 73/35
[58] Field of Search .................. 364/431.08; 123/425, 123/435; 73/35

[56] References Cited

U.S. PATENT DOCUMENTS

| | | | |
|---|---|---|---|
| 4,271,469 | 6/1981 | Kawai et al. | 364/431.08 |
| 4,347,820 | 9/1982 | Deleris | 123/425 |
| 4,356,551 | 10/1982 | Iwase et al. | 364/431.08 |
| 4,433,654 | 2/1984 | Yokooku | 123/425 |
| 4,477,875 | 10/1984 | Suzuki et al. | 364/431.08 |

FOREIGN PATENT DOCUMENTS 3308541 9/1984 Fed. Rep. of Germany .......... 73/35

Primary Examiner—Parshotam S. Lall
Attorney, Agent, or Firm—Charles E. Brown; Charles A. Brown

[57] ABSTRACT

This invention relates to a device for correcting functional quantities of an internal combustion engine in accordance with detonation. The correction is made by comparing the amplitude of a vibratory signal indicative of detonation with a reference signal.

In order to cause the correction to take place, a sensitivity factor is used multiplied by a correcting constant which depends on the value of the reference signal or on the ratio of the reference signal to the reference signal in the absence of detonation, this being an index of the basic characteristics and operating state of the engine and transducer.

2 Claims, 1 Drawing Figure

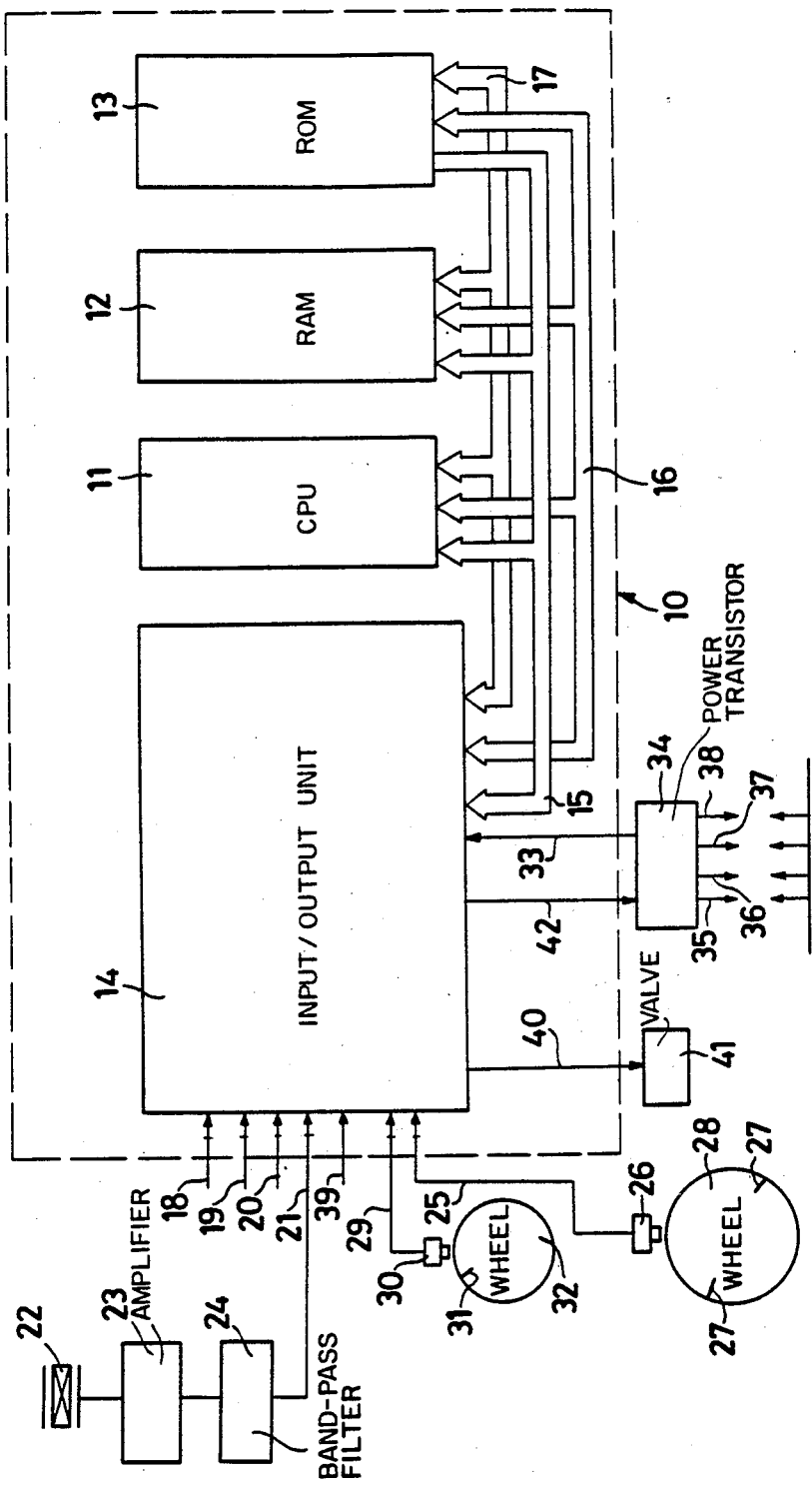

DEVICE FOR CORRECTING FUNCTIONAL QUANTITIES IN AN INTERNAL COMBUSTION ENGINE

This invention relates to a device for correcting, in accordance with detonation, functional parameters such as spark advance and supercharging pressure in a controlled ignition internal combustion engine.

The thermal efficiency of internal combustion engines can be improved by using explosion chambers of grouped arrangement and increasing the compression ratio. This leads to a reduction in fuel consumption and an increase in specific power.

However, as the compression ratio increases, so does the tendency of the engine to detonate because the maximum pressure and temperature of the cycle increase. On the other hand, the anti-detonating power of fuels is gradually falling because of the reduction in the allowable lead additives content.

A method commonly used for preventing detonation is to delay the ignition, so as to regain an adequate margin over the spark advance values at the limit of detonation.

This however penalises the engine, which suffers a reduction in power and efficiency.

It is therefore advisable, in order to improve thermal efficiency during engine partial load operation, to increase the compression ratio by either using supercharging or reducing the explosion chamber volume, whereas if good performance during acceleration is required then it is necessary to avoid penalising the engine during the transient state, and the engine can be prevented from causing detonation during full-throttle operation by using suitable means.

Electronically controlled ignition systems for regulating the spark advance in accordance with engine parameters are known. Some of these systems already control the detonation by varying the spark advance. In supercharged engines, supercharger pressure control means are provided which control the opening of a bleed valve downstream of the blower, or of a turbine bypass valve, where supercharging is by means of a turbocompressor.

The detonation transducers used are generally of two types, namely ionisation sensors and piezoelectric sensors or accelerometers. The former are located directly in the explosion chamber, whereas the latter are generally arranged on the cylinder head, on the cylinder block or on the engine intake manifold.

The detonation, which can be produced in each engine cylinder each time combustion occurs, is characterised by an increase in engine vibration generally in the frequency ranges of between 4 and 6 kHz and between 9 and 11 kHz. The transducers must therefore be able to sense vibrations of these frequencies.

The amplitude of a detonation pulse produced by the transducer can be as much as 20 times greater than the vibratory signal due to the background noise generated by the engine during normal operation without detonation.

Devices have therefore been proposed for correcting the spark advance and supercharging pressure in accordance with the detonation, in which the vibratory signal provided by the accelerometer within a prechosen angular range including the top dead centre, after passing through a band-pass filter, it is processed in order to obtain the mean value of the amplitude for a predetermined number of cycles; this value constitutes the reference signal with which the amplitude of the single pulse emitted during the next cycle by the accelerometer is compared.

If the ratio of the single pulse amplitude to the reference signal is greater than a predetermined detonation sensitivity value, the control device acts on the ignition system in order to delay the striking of the spark, in order to reduce the cycle pressure and temperature and restore normal combustion conditions.

The detonation sensitivity value varies with the engine operating conditions, and can for example be a function of the engine r.p.m. Our research on these devices has shown that they have certain limitations when used on series-produced engines in that they neglect certain factors which influence the construction and operation of such engines. These factors are mainly the constructional tolerances, which are inevitable even on engines of one and the same type, the state of engine aging, and the constructional tolerances of the detonation transducers themselves.

We have therefore improved the existing correction devices by introducing certain modifications which make them particularly suitable for solving the problems deriving from their use on series-produced engines.

The device according to the invention, for correcting functional quantities of an engine, comprises transducers for prechosen engine parameters, at least one engine vibratory signal transducer for sensing detonation, band-pass filter means for the vibratory signal, a microprocessor provided with a processing stage for calculating the functional quantities produced as a function of the prechosen engine parameters, with a processing stage for withdrawing the vibratory signal within a predetermined angular range of each engine cycle and for calculating a reference signal constituted by the mean value of the amplitude of the vibratory signal for a predetermined number of engine cycles, with memory locations containing predetermined detonation sensitivity factors as a function of a prechosen engine parameter, and with a processing stage for comparing the reference signal with the amplitude of a pulse of the vibratory signal emitted within a cycle subsequent to those of the predetermined number and for correcting the calculated functional quantities when the result of the comparison is greater than a predetermined sensitivity factor, and actuator means, operationally connected to the microprocessor, for causing the variation in the functional quantities to take place in accordance with the calculated and generally corrected values, the device being characterized in that the microprocessor also comprises further memory locations containing predetermined constants for correcting the sensitivity factors in accordance with the reference signal, and a processing stage for identifying the corresponding correcting constant in the further memory locations and for manipulating by means of the constant the sensitivity factor used in the comparison.

According to a further embodiment, the device is characterized in that the further memory locations contain predetermined constants for correcting the sensitivity factors in accordance with the ratio of the reference signal to a basic reference signal, the microprocessor comprising a processing stage for calculating, on initialisation of the microprocessor, the basic reference signal as the mean value of the amplitude of the vibratory signal originating from the transducer within a predetermined angular range of each engine cycle for a predetermined number of cycles, and a processing stage for calculating the ratio of reference signal to basic reference signal, for identifying the corresponding correcting constant in the further memory locations and for manipulating by means of the constant the sensitivity factor used in the comparison.

In this embodiment, the sensitivity factor varies with the engine operating conditions, and is in addition adjusted to the characteristics and state of the individual engine and transducer.

Characteristics and advantages of the invention will be more apparent from the description of a preferred embodiment shown diagrammatically on the accompanying FIGURE by way of non-limiting example.

In the FIGURE, the reference numeral 10 indicates overall a microcomputer constituted by a microprocessor (CPU) 11, a random access memory (RAM) 12, a read-only memory (ROM) 13 containing the data tables and operational programs of the microprocessor, and an input/output unit 14.

The microprocessor, memory and input/output unit are connected together by a parallel bus 15 for the data, a parallel bus 16 for the addresses, and a parallel bus 17 for the internal control signals.

The input/output unit 14 receives, by way of the line 18, a signal emitted by a sensor which senses the angular position of the engine feed throttle valve, receives by way of the line 19 a signal emitted by a sensor which senses the temperature of the engine cooling water, receives by way of the line 20 a signal emitted by a sensor which senses the temperature of the engine feed air, receives by way of the line 21 a signal emitted by an engine detonation transducer indicated by 22, and finally receives by way of the line 39 a signal emitted by a sensor which senses the engine supercharging pressure.

The transducer 22 is in this case a piezoelectric accelerometer fixed to the internal combustion engine cylinder head. The transducer is connected to an amplifier 23 connected to a band-pass filter 24, which allows passage of the engine vibratory signal lying for example within a frequency band of between 6 and 9 kHz.

The input/output unit 14 also receives, by way of the line 25, a pulse signal generated by the magnetic sensor 26 on passage of the notches 27 of the wheel 28, which is connected to the drive shaft.

In the case under examination, as the engine is a four cylinder, four-stroke engine supercharged by means of a turbocompressor, ignition must occur twice for each engine revolution. Thus the wheel 28, which can be the engine flywheel, is provided with two notches 27 disposed 180° apart and suitably phased with respect to the cylinder top dead center. As these two notches pass in front of the sensor 26, they generate two reference pulses for each engine revolution. Each of these pulses corresponds to the ignition advance calculated by the microprocessor.

The pulse signal generated by the sensor 26 is also used by the microprocessor for calculating the engine r.p.m.

The unit 14 receives through the line 29 a second pulse signal emitted by the magnetic sensor 30 on passage of the notch 31 of the wheel 32, connected to a shaft which rotates at one half of the engine speed.

The notch 31 is also suitably phased with respect to the cylinder top dead center, and the pulse signal which it generates for every two engine revolutions is used for counting the engine cycles, the engine being of the four-stroke type.

The unit 14 is connected by the lines 42 and 33 to the final stage 34 of the engine ignition system. This final stage comprises a power transistor 34 connected to the electricity supply, the ignition coil to which the transistor is also connected, and a distributor for distributing high voltage to the spark plugs, indicated in FIG. 1 by 35, 36, 37, 38. The unit 14 is also connected by the line 40 to the block 41 which diagrammatically represents a valve in the supercharger turbine bypass. The values of the detonation sensitivity factors S as a function of prechosen engine parameter, for example the engine r.p.m., are tabulated in the memory 13.

The same memory also contains the tabulation of the values of the sensitivity factor correcting constants K as a function of a reference signal R or as a function of the ratio of a reference signal R to a basic reference signal Ro, where the reference signal R is constituted by the mean value of the amplitude of the vibratory signal originating from the transducer 22 calculated for a predetermined number of engine cycles during the engine operation, and the basic reference signal Ro is constituted by the mean value of the amplitude of the vibratory signal originating from the transducer 22 calculated for a predetermined number of engine cycles on initialisation of the microprocessor.

The described device operates in the following manner.

If the values of the correcting constant K are tabulated in the memory as a function of the ratio, at the moment of its initialisation the microprocessor calculates the value of the basic reference signal Ro as the mean value of the amplitude of the vibratory signal originating from the transducer 22 under these conditions, i.e. in the absence of detonation.

The mean value is calculated for a predetermined number of engine cycles by withdrawing the vibratory signal of the transducer 22 within a predetermined angular range of each engine cycle. This mean value constitutes the basic reference signal Ro and is memorised in the RAM 12.

In contrast, if the values of the correcting constant K are tabulated in the memory as a function of the reference signal, the microprocessor does not calculate the basic reference signal Ro.

The microprocessor 11 then continues by executing the calculation programs and uses the tables of data contained in the read-only memory 13 to process the signals, indicative of the engine operating conditions, which enter the unit 14 and to calculate as a function of these signals the most suitable spark advance angle with respect to the top dead center. The microprocessor then converts the calculated spark advance angle into a delay time $t_r$, with respect to a base reference, which in this particular case is the pulse generated by the notch 27 which precedes the top dead centre of the cylinder in the compression stage.

If the engine is subject to detonation, the microprocessor is able to make a correction to the calculated spark advance angle, to the corresponding delay time and to the supercharging pressure, by processing the vibratory signal originating from the transducer 22.

The microprocessor withdraws said vibratory signal within a predetermined angular range of each engine cycle and calculates the mean value of the amplitude for a predetermined number of engine cycles. This mean value constitutes the reference signal R with which the microprocessor compares the amplitude of a pulse of the vibratory signal emitted by the transducer 22 in a cycle subsequent to those of said predetermined number. In making the comparison, the microprocessor uses a detonation sensitivity factor which it takes from the tabulated values in the ROM 13 on the basis of the effective engine r.p.m. The microprocessor also uses a sensitivity factor correcting constant K which it takes from the values tabulated in the ROM 13 on the basis either of the calculated value of the reference signal R or of the ratio of the reference signal R to the basic reference signal Ro.

The microprocessor multiplies the sensitivity factor by the correcting constant determined in this manner, and checks whether the ratio of the amplitude of said vibratory signal pulse to the reference signal is greater or less than the sensitivity factor corrected as stated heretofore.

If the ratio is greater, the microprocessor is able to correct the supercharging pressure in the sense of reducing it, by opening the valve 41 in the turbine bypass, and also corrects the calculated spark advance angle in the sense of retarding it until the detonation disappears and said ratio is less than the corrected sensitivity factor.

On arrival of the pulse generated by the notch 27 corresponding to the cylinder in the compression stage, the microprocessor triggers the counting of the calculated delay time, possibly corrected in the presence of detonation, and at the end of the count causes inhibition of the power transistor 34 of the final stage, to interrupt the charge on the engine ignition coil, which thus results in the striking of the spark at the spark plug of the cylinder in the compression stage.

The correction signal indicative of detonation, as calculated by the microprocessor by the procedure heretofore described, can thus be used not only for correcting the spark advance but also for regulating the supercharging pressure in the sense of reducing it, where the engine is of the supercharged type.

What is claimed is:

1. A device for correcting functional quantitites of a controlled-ignition internal combustion engine, said device comprising transducers for signals of prechosen engine parameters, at least one engine vibratory signal transducer for sensing detonation, band-pass filter means for filtering said vibratory signal, a microprocessor being provided with a processing stage for calculating said functional quantities produced as a function of said prechosen engine parameters, with a processing stage for withdrawing said vibratory signal within a predetermined angular range of each engine cycle and for calculating a reference signal constituted by the mean value of the amplitude of said vibratory signal for a predetermined number of engine cycles, with memory locations containing predetermined detonation sensitivity factors produced as a function of one of said prechosen engine parameters, and with a processing stage for comparing said referene signal with the amplitude of a pulse of the vibratory signal emitted within a cycle subsequent to those of predetermined number and for correcting the calculated functional quantities when the result of said comparison is greater than a prechosen sensitivity factor, and actuator means, operationally connected to said microprocessor, for causing the variation in said functional quantities to take place in accordance with the calculated and corrected values, the device being characterized in that said microprocessor also comprises further memory locations containing predetermined constants for correcting said sensitivity factors in accordance with said reference signal, and a processing stage for identifying the corresponding correcting constant in said further memory locations and for manipulating by means of said correcting constant the sensitivity factor used in said comparison.

2. A device as claimed in claim 1, characterised in that said further memory locations contain predetermined constants for correcting said sensitivity factors in accordance with the ratio of said reference signal to a basic reference signal, said microprocessor comprising a processing stage for calculating, on initialization of the microprocessor, said basic reference signal as the mean value of the amplitude of the vibratory signal originating from said transducer within a predetermined angular range of each engine cycle for a predetermined number of cycles, and processing stage for calculating said ratio of reference signal to basic reference signal, for identifying the corresponding correcting constant in said further memory locations and for manipulating by means of said correcting constant the sensitivity factor used in said comparison.

* * * * *